(12) United States Patent
Ezrielev et al.

(10) Patent No.: US 12,405,930 B2
(45) Date of Patent: Sep. 2, 2025

(54) SYSTEM AND METHOD FOR IDENTIFYING POISONED DATA DURING DATA CURATION USING DATA SOURCE CHARACTERISTICS

(71) Applicant: Dell Products L.P., Round Rock, TX (US)

(72) Inventors: Ofir Ezrielev, Beer Sheva (IL); Hanna Yehuda, Acton, MA (US); Kristen Jeanne Walsh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 342 days.

(21) Appl. No.: 18/343,946

(22) Filed: Jun. 29, 2023

(65) Prior Publication Data

US 2025/0005147 A1    Jan. 2, 2025

(51) Int. Cl.
    *G06F 16/215*    (2019.01)
(52) U.S. Cl.
    CPC ................................. *G06F 16/215* (2019.01)
(58) Field of Classification Search
    CPC ..................................................... G06F 16/215
    See application file for complete search history.

(56) References Cited

U.S. PATENT DOCUMENTS

| | | | |
|---|---|---|---|
| 7,315,805 B2 | 1/2008 | Slater | |
| 10,168,691 B2 | 1/2019 | Zornio et al. | |
| 10,936,479 B2 | 3/2021 | Maag et al. | |
| 11,101,037 B2 | 8/2021 | Allen | |
| 11,221,270 B2 | 1/2022 | Evans | |
| 11,341,605 B1 | 5/2022 | Singh | |
| 11,853,853 B1 | 12/2023 | Beauchesne et al. | |
| 12,008,046 B1 | 6/2024 | Curtis et al. | |
| 12,242,892 B1 | 3/2025 | Burnett | |

(Continued)

OTHER PUBLICATIONS

Wang, Haozhe, et al., "A graph neural network-based digital twin for network slicing management," IEEE Transactions on Industrial Informatics 18.2 (2020): 1367-1376 (11 Pages).

(Continued)

*Primary Examiner* — Maher N Algibhah
(74) *Attorney, Agent, or Firm* — WOMBLE BOND DICKINSON (US) LLP

(57) ABSTRACT

Methods and systems for curating data from data sources are disclosed. Data may be curated from various data sources before being supplied to downstream consumers that may rely on the trustworthiness of the curated data to facilitate desired computer-implemented services. During data curation, collected data may undergo anomaly detection to identify anomalies in the data. Data anomalies may indicate the presence of poisoned data that, if provided to downstream consumers, may negatively impact the desired computer-implemented services. When poisoned data is detected among the data, a poisoned portion of the data may be identified using an optimization process. The optimization process may consider the degree of anomalousness of the data (e.g., using statistical representations of the anomaly) and/or characteristics of the data source that supplied the anomalous data to identify the poisoned portion. Remedial actions may be identified and/or performed in order to reduce an impact of the poisoned data.

20 Claims, 4 Drawing Sheets

(56) References Cited

U.S. PATENT DOCUMENTS

| | | |
|---|---|---|
| 2004/0064750 A1 | 4/2004 | Conway |
| 2006/0009881 A1 | 1/2006 | Ferber et al. |
| 2014/0037161 A1 | 2/2014 | Rucker |
| 2014/0136184 A1 | 5/2014 | Hatsek |
| 2016/0098037 A1 | 4/2016 | Zornio |
| 2018/0081871 A1 | 3/2018 | Williams |
| 2019/0034430 A1 | 1/2019 | Das |
| 2019/0236204 A1 | 8/2019 | Canim |
| 2019/0251479 A1* | 8/2019 | Anderson ........... H04L 63/1466 |
| 2019/0370263 A1 | 12/2019 | Nucci |
| 2020/0166558 A1 | 5/2020 | Weis |
| 2020/0167224 A1 | 5/2020 | Abali |
| 2020/0202478 A1 | 6/2020 | Thumpudi et al. |
| 2020/0293684 A1 | 9/2020 | Harris |
| 2021/0027771 A1 | 1/2021 | Hall |
| 2021/0116505 A1 | 4/2021 | Shu |
| 2021/0374143 A1 | 12/2021 | Neill |
| 2021/0377286 A1* | 12/2021 | Shukla .................. G06F 21/577 |
| 2021/0406110 A1 | 12/2021 | Vaid et al. |
| 2022/0092234 A1 | 3/2022 | Karri |
| 2022/0301027 A1 | 9/2022 | Basta |
| 2022/0310276 A1 | 9/2022 | Wilkinson |
| 2022/0374399 A1 | 11/2022 | Kementsietsidis |
| 2023/0014438 A1 | 1/2023 | Jones |
| 2023/0040834 A1 | 2/2023 | Haile |
| 2023/0126260 A1 | 4/2023 | Elsakhawy et al. |
| 2023/0153095 A1 | 5/2023 | Rahill-Marier |
| 2023/0196096 A1 | 6/2023 | Milne |
| 2023/0213930 A1 | 7/2023 | Rakshit |
| 2023/0315078 A1 | 10/2023 | Sepulveda et al. |
| 2023/0342281 A1 | 10/2023 | Haile |
| 2023/0418280 A1 | 12/2023 | Emery |
| 2024/0119364 A1 | 4/2024 | Jain |
| 2024/0126888 A1* | 4/2024 | Kalou .................. G06F 21/577 |
| 2024/0235952 A9 | 7/2024 | Hicks |
| 2024/0281419 A1 | 8/2024 | Alfaras |
| 2024/0281522 A1 | 8/2024 | Kuo |
| 2024/0330136 A1 | 10/2024 | Furlong |
| 2024/0412104 A1 | 12/2024 | Zhang |

OTHER PUBLICATIONS

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0' Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud,. Jun. 10, 2021, Web Page <https://cloud.google.com/blog/topics/financial-services/detect-anomalies-in-real-time-forex-data-with-ml> accessed on Feb. 14, 2023 (16 Pages).

Wang, Haozhe, et al., "A graph neural network-based digital twin for network slicing management," IEEE Transactions on Industrial Informatics 18.2 (2020): 1367-1376 (10 Pages).

* cited by examiner

SYSTEM AND METHOD FOR IDENTIFYING POISONED DATA DURING DATA CURATION USING DATA SOURCE CHARACTERISTICS

FIELD

Embodiments disclosed herein relate generally to data management. More particularly, embodiments disclosed herein relate to systems and methods to identify poisoned data that may be introduced during data curation.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
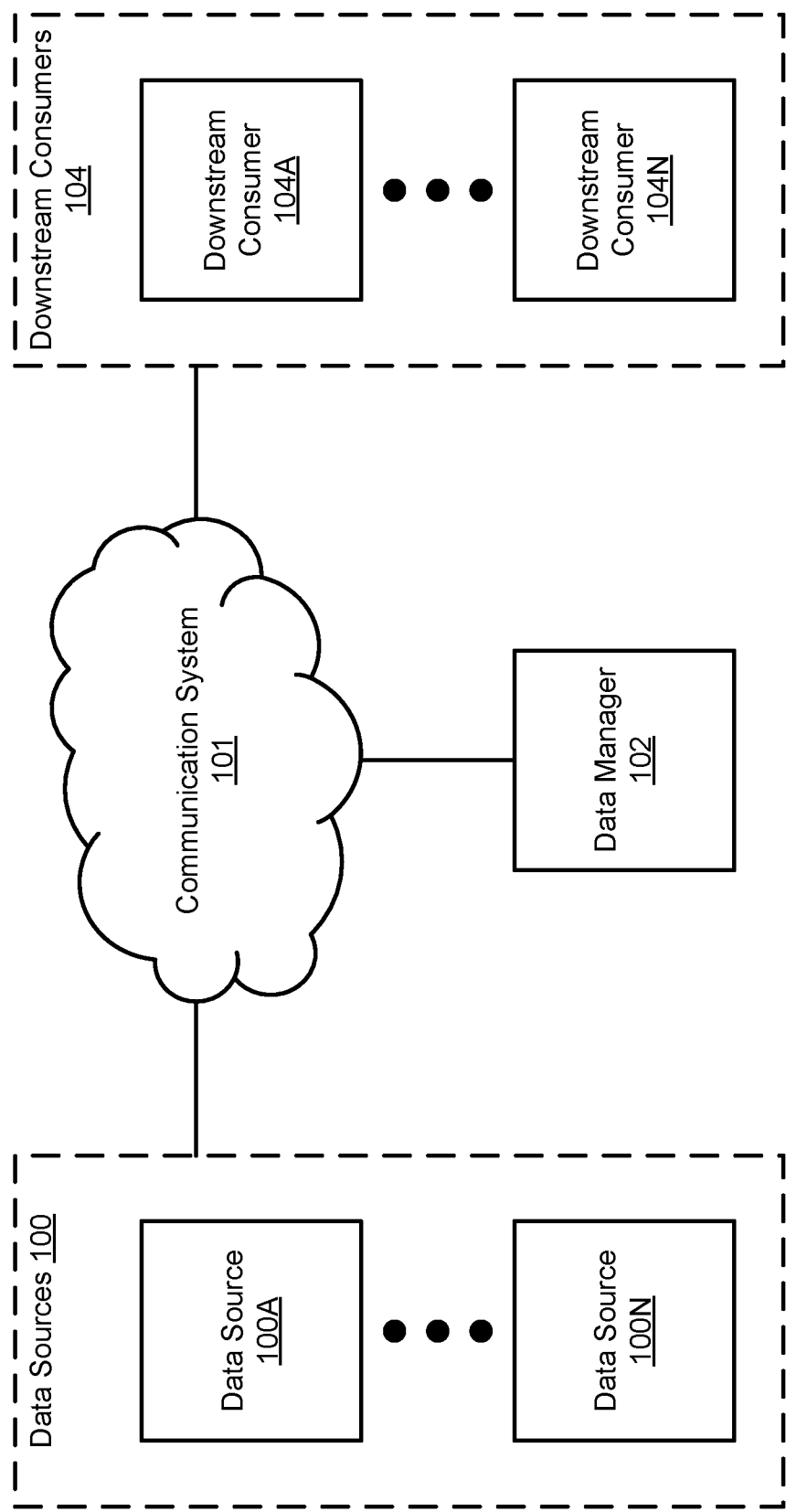
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for curating data from data sources prior to addition to (e.g., being stored in) a data repository. Data curation may refer to a process of collecting, organizing, preserving, and/or maintaining data for use by consumers. For example, downstream consumers of curated data may rely on raw and/or processed (e.g., transformed, organized, etc.) data being made accessible in order to provide computer-implemented services.

Data curation may include obtaining data from various data sources and/or storing the data in one or more data repositories. The data repository may be managed by a data manager that may also manage the data curation process, which may include quality control measures. For example, quality control measures may be implemented in order to detect anomalous data collected from the data sources, such as poisoned data provided by malicious parties. To detect and/or measure the anomalousness of the collected data, statistical methods may be employed. When an anomaly is detected (e.g., by comparing a statistical characterization of a data point to a threshold), the data manager and/or the downstream consumers may be alerted of the presence of poisoned data.

However, small-scale anomaly detection (e.g., performed on individual or small groups of data points of raw data) may not detect certain types of anomalous data, such as large amounts of statistically consistent anomalous data and/or poisoned data designed to otherwise remain undetected during anomaly detection processes. Therefore, to detect these types of malicious attacks, anomaly detection may be performed on a larger scale using aggregate data.

In addition, some data anomalies (e.g., identified during anomaly detection) may represent anomalous portions of data that pose a more significant risk to downstream consumers than other anomalous portions of data represented by other data anomalies. For example, an historically trusted data source may unknowingly supply lower quality data than usual, the lower quality data posing a small threat (e.g., an inconvenience) to downstream consumers, whereas a malicious data source may purposely supply malicious data designed with an intent to maximize a negative impact on downstream consumers, posing a greater threat (e.g., cessation and/or misuse of the computer-implemented services).

When the presence of anomalous data is detected in large amounts of data, only the poisoned portions may pose a threat to the downstream consumers. The poisoned portions (e.g., the smallest portions of data only including poisoned data) may be identified using optimization methods (e.g., global optimization methods). The optimization methods may consider the characteristics of the data sources that supply the data in order to generate a likelihood that a detected data anomaly represents malicious (e.g., poisoned) data.

Further, the poisoned data (e.g., and information regarding malicious data sources that supplied the poisoned data) may be used to generate actions (e.g., action sets). The action sets may be performed in order to remediate the current and/or future impacts of the poisoned data (and/or the malicious data source) on the computer-implemented services provided by the downstream consumers.

By doing so, embodiments disclosed herein may provide a system for identifying poisoned data collected from various data sources during data curation. The detection and identification of anomalous data (e.g., poisoned data introduced by malicious parties) may be improved by (i) performing anomaly detection at an aggregate level to detect anomalous data, (ii) identifying one or more malicious data sources that supplied the anomalous data, and/or (iii) identifying poisoned portions of data represented by the anomalous data using optimization methods. The collected data and/or the data source(s) that supplied the collected data may be classified and/or managed by performing remedial actions that may increase the likelihood of providing the downstream consumers with uninterrupted and/or reliable access to unpoisoned (e.g., higher quality) data.

By doing so, an improved computing device and/or distributed system may be obtained. The improved device and/or system may be more likely to be able to provide the desired computer-implemented services.

In an embodiment, a method for curating data from data sources prior to addition to a data repository is provided. The method may include making an identification that the data includes poisoned data. Based on the identification, the method may include obtaining a fitness analysis function based on criteria for evaluating potentially poisoned data, the criteria including: an historical security posture for each data source of the data sources; a current security posture of each data source; and a number of data sources providing the data.

The method may also include: performing an optimization process using the data to identify the poisoned data, the optimization process including generating test proposals that indicate different delineations between the potentially poisoned data and potentially unpoisoned data, and evaluating the test proposals using the fitness analysis function; and, initiating performance of an action set, based on the identified poisoned data, to manage an impact of the identified poisoned data.

Making the identification may include performing an anomaly detection process using at least an anomaly threshold and a first degree of anomalousness of the data, the data being aggregate data and the first degree of anomalousness being based on a first aggregate data summary for the aggregate data.

The criteria may further include degrees of anomalousness of portions of the data and sizes of the portions.

The current security posture of each data source may be based on a degree of anomalousness of the data with respect to historical data, the historical data being provided by the data source prior to the data source supplying the data.

The fitness analysis function may penalize each test proposal proportionally to a ratio of a size of a potentially poisoned portion of the data to a size of a potentially unpoisoned portion of the data.

The fitness analysis function may penalize each test proposal proportionally to the number of data sources providing the data.

Performing the optimization process may include iteratively generating sets of the test proposals, each subsequent set of the sets being generated based on a selection of the test proposals from a previous set, the selection being based on a rank ordering of the test proposals of the previous set.

The rank ordering may be obtained by evaluating each test proposal of the test proposals using the fitness analysis function to obtain a fitness value for each test proposal, and obtaining the rank for each test proposal based on the fitness value, the rank being usable to order the test proposals.

Identifying the poisoned data may include selecting a final test proposal of the test proposals based on the ranks of the test proposals, the final test proposal being an optimized solution of the optimization process.

The action set may include screening the poisoned data from use by a downstream consumer. The action set may also include identifying a potentially malicious data source that provided at least a portion of the identified poisoned data.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services utilizing data obtained from any number of data sources and managed by a data manager prior to performing the computer-implemented services. The computer-implemented services may include any type and quantity of computer-implemented services. For example, the computer-implemented services may include monitoring services (e.g., of locations), communication services, and/or any other type of computer-implemented services.

The computer-implemented services may be performed, in part, by using artificial intelligence (AI) models. The AI models may, for example, be implemented with artificial neural networks, decision tress, regression analysis, and/or any other type of model usable for learning purposes. For example, data obtained from data sources may be used as training data (e.g., used to train the AI models to perform the computer-implemented services), and/or as ingest data (e.g., used as input to the trained AI models in order to perform the computer-implemented services).

To facilitate the computer-implemented services, the system may include data sources 100. Data sources 100 may include any number of data sources. For example, data sources 100 may include one data source (e.g., data source 100A) or multiple data sources (e.g., 100A-100N). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of temperature sensors positioned in an environment to collect temperature measurements according to a data collection schedule. Data sources 100 may be associated with a data pipeline and, therefore, may collect the temperature measurements, may perform processes to sort, organize, format, and/or otherwise prepare the data for future processing in the data pipeline, and/or may provide the data to other data processing systems in the data pipeline (e.g., via one or more application programming interfaces (APIs)).

The data provided by data sources 100 may include metadata such as data source characteristics (e.g., information regarding the data source). Data source characteristics may include (i) a security posture (e.g., security status) of the data source, (ii) a type of data source (e.g., database, application, etc.), (iii) a vendor and/or host of the data source host, (iv) an amount of data provided by the data source over a given time period, and/or (v) other information describing the data source (e.g., data source identifiers (IDs), configuration information, download and/or upload speeds, etc.).

Data sources 100 may provide data to data manager 102. Data manager 102 may include any number of data processing systems including hardware and/or software components configured to facilitate performance of the computer-implemented services. Data manager 102 may include a database (e.g., a data lake, a data warehouse, etc.) to store data obtained from data sources 100 (and/or other entities throughout a distributed environment).

Data manager 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services. Continuing with the above example, data manager 102 may obtain the temperature measurements from data sources 100 as part of the data pipeline. Data manager 102 may obtain the temperature measurements via a request through an API and/or via other methods.

Prior to data being stored by data manager 102, data may be subjected to quality control measures. The quality control measures may include the monitoring and/or analysis of the data. For example, as data is collected, anomaly detection processes may be performed in order to identify unexpected changes in the collected data. Anomaly detection may be used to identify incomplete, irrelevant, and/or inaccurate data among the collected data. Anomaly detection algorithms may employ statistical analysis and/or machine learning to identify data that deviates from a norm (e.g., what is historically expected). For more details regarding anomaly detection, refer to the discussion of FIG. 2.

Data curation (e.g., anomaly detection) may be performed by a data processing system of data manager 102 and/or a data processing system independent of data manager 102 (e.g., a third party).

Continuing with the above example, data manager 102 may curate the temperature data (e.g., identify errors/omissions and correct them, etc.) and may store the curated temperature data temporarily and/or permanently in a data lake or other storage architecture. Following curating the temperature data, data manager 102 may provide the temperature measurements to other entities for use in performing the computer-implemented services.

Data managed by data manager 102 (e.g., stored in a data repository managed by data manager 102, obtained directly from internet of things (IoT) devices managed by data manager 102, etc.) may be provided to downstream consumers 104. Downstream consumers 104 may utilize the data from data sources 100 and/or data manager 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

However, if the data utilized by downstream consumers 104 is untrustworthy (e.g., includes poisoned data), the computer-implemented services facilitated by downstream consumers 104 may be negatively affected. For example, data obtained from a malicious data source of data sources 100 may include poisoned portions of data that may be untrustworthy. The poisoned portions may be provided by malicious parties with the intent to negatively impact (and/or influence the outcome of the computer-implemented services provided by) the downstream consumers. Thus, the detection of anomalous data (e.g., poisoned data) may be implemented to ensure the provision of desired computer-implemented services.

Continuing with the above example, downstream consumers 104 may utilize the temperature data via data manager 102 as input data for climate models. Specifically, downstream consumers 104 may utilize the temperature data to simulate future temperature conditions in various environments over time (e.g., to predict weather patterns, climate change, etc.). However, the introduction of poisoned temperature data (e.g., incorrect temperature data) may skew the climate models, and/or may negatively impact the simulations, which may prevent downstream consumers 104 from providing the desired computer-implemented services.

In general, embodiments disclosed herein may provide methods, systems, and/or devices for curating data from data sources. The data curation methods may employ processes that may (i) perform data aggregation of data collected from the data sources (e.g., to obtain aggregate data summaries), (ii) detect the presence of anomalous data (e.g., poisoned data) in the collected data sources (e.g., using statistical analysis of the aggregate data summaries), (iii) identify data source characteristics (e.g., security postures) of a data source that supplied the anomalous data, (iv) identify data portions of the anomalous data (e.g., using the data source characteristics), (v) identify potentially malicious data sources, and/or (vi) identify remedial actions that may be performed to manage the impact of the anomalous data portions and/or potentially malicious data sources (e.g., impacts on downstream consumers). By doing so, the system may be more likely to be able to provide trustworthy data to downstream consumers that may facilitate performance of the desired computer-implemented services.

Figure 2:
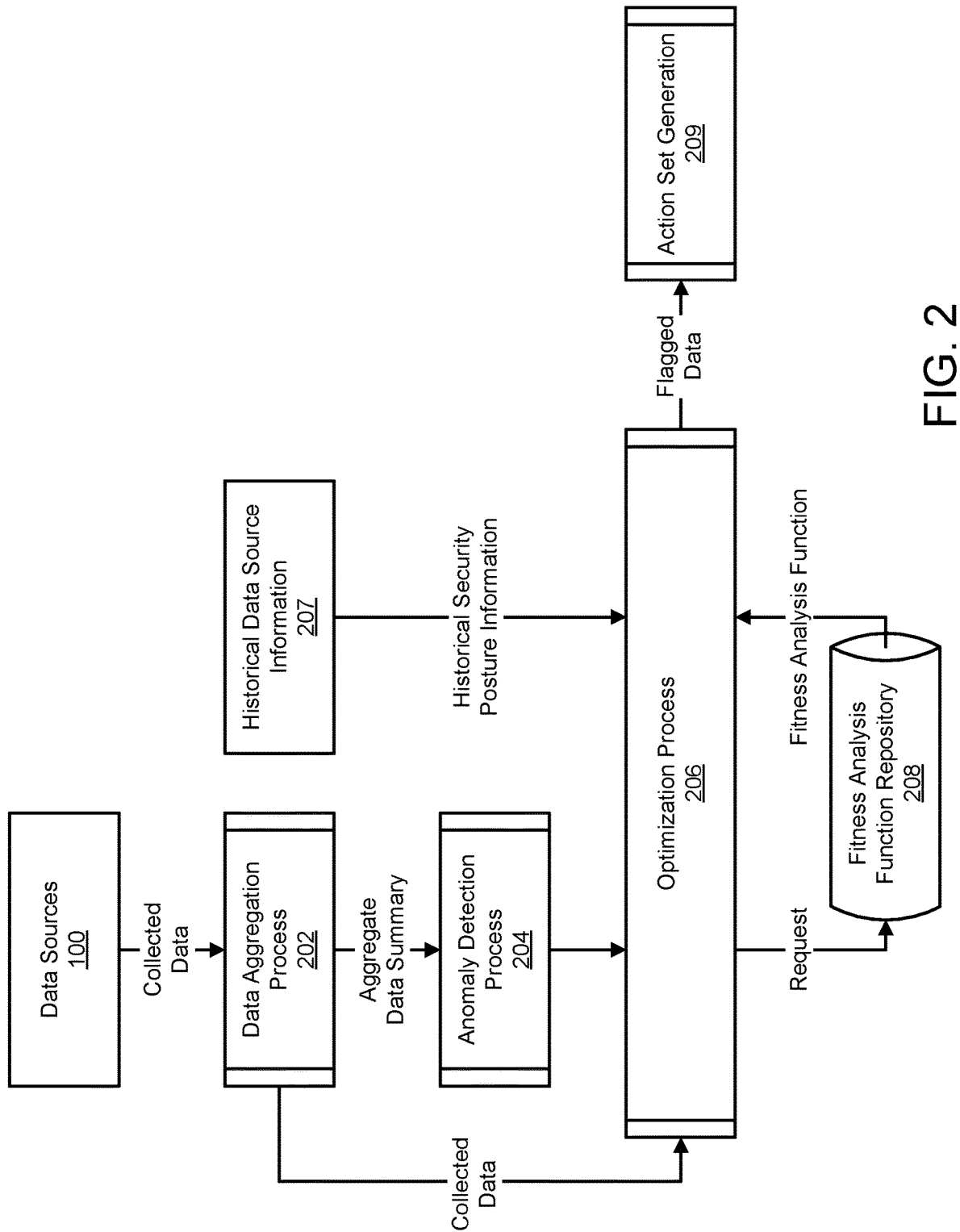
FIG. 2 shows a data flow diagram illustrating a process of identifying poisoned data in accordance with an embodiment.
Figure 3:
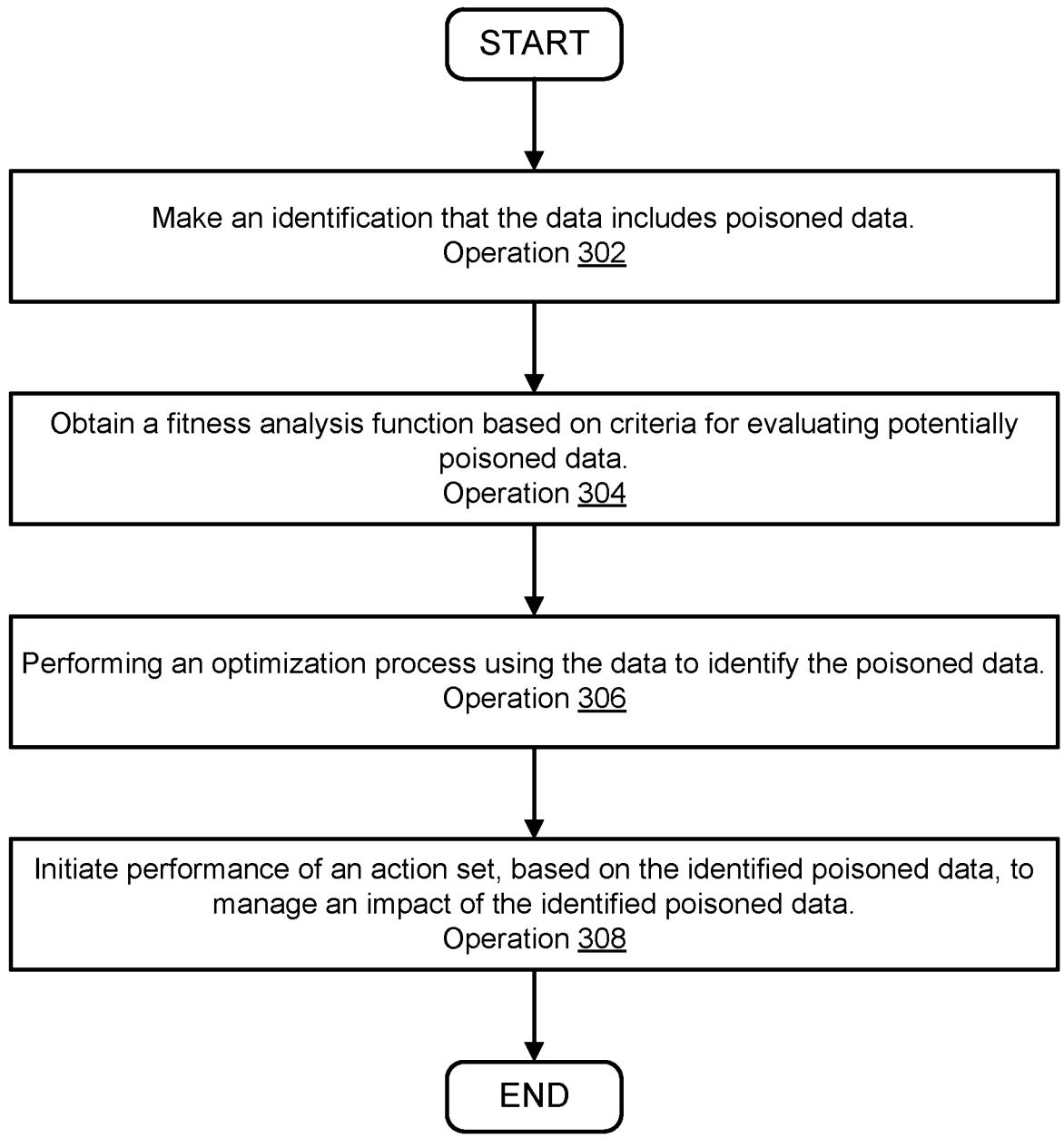
FIG. 3 shows a flow diagram illustrating a method for curating data in accordance with an embodiment.

When performing its functionality, data sources 100, data manager 102, and/or downstream consumers 104 may perform all, or a portion, of the methods and/or actions shown in FIGS. 2-3.

Data sources 100, data manager 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, one or more of data sources 100, data manager 102, and/or downstream consumers 104 are implemented using an internet of things (IoT) device, which may include a computing device. The IoT device may operate in accordance with a communication model and/or management model known to data sources 100, data manager 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

While the above example relates to climate models, it will be appreciated that data may be collected and/or stored in data repositories in order to provide other types of computer-implemented services without departing from embodiments disclosed herein.

The system described in FIG. 1 may be used to identify anomalies (e.g., statistical anomalies) during data curation. The anomalies may indicate the presence of poisoned data, which may be identified in order to mitigate its effects. The following operations described in FIG. 2 may be performed by the system in FIG. 1 when providing this functionality.

Turning to FIG. 2, a data flow diagram is shown in accordance with an embodiment. The data flow diagram may illustrate a process of identifying poisoned data in a system similar to that of FIG. 1. The poisoned data may be identified using various processes, including data aggregation processes, anomaly detection processes, and/or optimization processes.

As discussed with respect to FIG. 1, data sources 100 may provide data (e.g., curated data) to downstream consumers 104 in order to facilitate the provision of computer-implemented services. The data curation process may collect, organize, and/or transform raw data into data usable by downstream consumers.

Raw data obtained from data sources 100 (e.g., collected data) may undergo data aggregation process 202. Data aggregation process 202 may be performed at a large scale (e.g., using large amounts of data), and may include gathering portions of the collected data and/or compiling the collected data. For example, data points of the raw data may be aggregated with respect to time (e.g., within a time interval), and/or may be summarized at different levels of granularity (e.g., the summary may include statistics describing individual data points and/or compiled statistics describing groups of data points). The summary may include a report of statistics such as minimum, maximum, mean, standard deviation, mode, sum, count, etc., the values of which may be used to gain insight into data anomalousness.

As used herein, when data is referred to being anomalous, the anomalousness may be in reference to the statistics of the data (e.g., the statistics of the aggregate data) as being anomalous with respect to the statistics of other data (e.g., other aggregate data). As such, anomalous data may be untrustworthy (e.g., poisoned, irrelevant, etc.).

Continuing with the temperature data example, the temperature measurements collected from temperature sensors may be aggregated by geographical region over a number of years. An aggregate data summary may include compiled statistics (e.g., daily minimum, daily maximum, hourly average, etc.) that describe the temperature measurements for each day of each year for the geographical region. The data (e.g., compiled statistics) presented in the aggregate data summary may be used, for example, to identify whether the collected temperature data (and/or newly collected temperature data) includes anomalous (e.g., untrustworthy) temperature measurements.

Any number of summaries (e.g., aggregate data summaries) may be generated during data aggregation process 202. Data aggregation process 202 may include storing the aggregate data summaries in a database where the summaries may be collated and/or later accessed for further statistical analysis (e.g., for the purposes of anomaly detection).

Anomaly detection process 204 may obtain an aggregate data summary generated by data aggregation process 202. Anomaly detection process 204 may be performed using statistical analysis, for example, by generating statistical characterizations (e.g., statistical measurements) of the aggregate data (e.g., using information from an aggregate data summary of the aggregate data). The statistical characterization may indicate the degree of anomalousness of the aggregate data. To determine whether the aggregate data described by the statistical characterization includes anomalous data, the statistical characterization may be compared to an anomaly threshold. For example, when a statistical characterization (e.g., z-score, ratio, and/or other forms of statistical measurement) of aggregate data exceeds the anomaly threshold, the data (e.g., collected data) represented by the aggregate data may be treated as including poisoned data.

Anomaly detection process 204 may also be performed using an AI model trained to perform anomaly detection on aggregate data. For example, the AI model may be trained using historical aggregate data that has been labeled (e.g., by a user) based on historical outcomes of data poisoning. The trained AI model may then generate predictions and/or likelihoods for whether newly generated aggregate data includes anomalous data (e.g., whether newly collected data represented by the newly generated aggregate data includes poisoned data).

When anomalous data is detected during anomaly detection process 204, information regarding the anomalous data may be provided to and/or accessed by optimization process 206, which may be a global optimization process. Information regarding the anomalous data may include (i) a notification (e.g., that an anomaly was detected), (ii) data pointers (e.g., that point to the addresses of the collected data summarized in the aggregate data summary), (iii) an anomaly threshold value, (iv) a statistical characterization (e.g., a type and/or a value indicating the degree of anomalousness of the anomaly), (v) data source characteristics (e.g., data source IDs), and/or (vi) other information regarding the detected anomaly.

Optimization process 206 may use the information regarding the anomaly to identify a poisoned portion of data associated with the anomaly detected during anomaly detection process 204. Optimization process 206 may optimize (e.g., minimize or maximize) a fitness analysis function, and the fitness analysis function may be used to constrain and/or quantify possible solutions of optimization process 206. Optimization process 206 may be implemented using an optimization algorithm such as a genetic algorithm and/or other global optimization algorithms that may be used to solve optimization problems for complex datasets and/or multivariate objective functions.

To identify the poisoned portion of data, optimization process 206 may obtain information from anomaly detection process 204 (e.g., regarding the detected anomaly associated with the aggregate data summary) and/or a dataset from data aggregation process 202 (e.g., the collected data associated with the aggregate data summary). The optimization algorithm may generate (e.g., iteratively) sets of test proposals, where each test proposal indicates a different delineation of the dataset. The delineations may define two portions of the dataset: a first portion being potentially poisoned, and a second portion being potentially unpoisoned. The first iteration of test proposals may be randomly generated (e.g., based on a random sampling of the data). Subsequent iterations of test proposals may be generated based on a selection of test proposals from the previous iteration, and iterations may continue until a satisfactory solution (e.g., the optimized solution) is determined, and/or a maximum number of iterations is reached.

Each test proposal of a given iteration may be evaluated (e.g., assigned a fitness value) using a fitness analysis function. The fitness analysis function may be based on criteria (e.g., optimization criteria) for evaluating potentially poisoned data portions. The optimization criteria may include data characteristics such as (i) a size of a portion of the data (e.g., a potentially poisoned portion), (ii) a degree of anomalousness of a portion of the data (e.g., a potentially unpoisoned portion associated with the potentially poisoned portion), and/or (iii) any other criterion useful for evaluating the data portions (e.g., anomaly thresholds).

The optimization criteria may also include data source characteristics such as (i) a number of data sources that supplied the potentially poisoned data, (ii) a current security posture of the data source(s), (iii) an historical security posture of the data source(s), and/or (iv) any other criterion relating to data sources. Examples of other criterion may include data source host identifiers, data source reliability (e.g., the historical consistency and/or variation in data anomalousness), and/or data source reputation (e.g., whether historical data anomalousness is due to poor data quality, data poisoning, etc.).

For example, the statistical characterization of the potentially unpoisoned portion may be compared to an anomaly threshold (e.g., the same anomaly threshold used as part of anomaly detection process 204). If the statistical characterization (e.g., degree of anomalousness) is inferior to the anomaly threshold, then the test proposal may be evaluated further (e.g., using other optimization criteria of the fitness analysis function).

The fitness analysis function may be generated and/or obtained by optimization process 206. Historical data source information 207 may include one or more optimization criteria that may be used to generate one or more fitness analysis functions. Historical data source information 207 may be stored and/or accessed locally or remotely. Historical data source information 207 may provide information to optimization process 206, and/or the provided information may be regarding one or more data sources that have previously supplied data (e.g., historical data), such as historical security posture information for the one or more data sources.

The security posture of the data source may refer to an estimate of the overall security status of the data source (e.g., the security status of networks, data, and/or systems of the data source). The security posture of a data source may be influenced by factors such as authentication and/or access controls, network security, data encryption, security policies and procedures, etc. For example, the security posture may be an indicator of the security competence of the data source and/or its ability to prevent malicious parties from accessing software and/or hardware components of the data source. Thus, the security posture may reflect a level of trustworthiness of the data source. The security posture of a given data source may be inferred, for example, based on the degree of anomalousness of current and/or historical data provided by the data source.

The security posture of a data source may be measured using a security posture score. The security posture score of the data source may be determined based on (i) one or more degrees of anomalousness of data provided by the data source, (ii) a relative magnitude of impact of the data source (e.g., an impact of anomalous data from the data source on downstream consumers and/or their provided computer-implemented services), and/or (iii) other factors influencing the security posture of the data source. The security posture score may be used to infer the trustworthiness of data provided by the data source. For example, a higher security posture score of a first data source may indicate that the first data source is better secured (e.g., from malicious attacks) and/or has a lower likelihood of providing poisoned data than a second data source with a lower security posture score.

The current security posture (e.g., current security posture score) of a data source may reflect a level of current (e.g., recent and/or present) trustworthiness of the data source. The current security posture may be based on a degree of anomalousness of current data obtained from the data source with respect to the degree of anomalousness of historical data obtained from the data source. In other words, a current security posture score may be based on a change in the degree of anomalousness between current and historical data provided by the data source. For example, the current security posture may indicate a change in the security posture of the data source when compared to an historical security posture (score) of the data source.

The historical security posture (e.g., historical security posture score) of a data source may reflect level of trustworthiness prior to the current security posture (score) of the data source. Historical security posture information provided by historical data source information 207 may be used to obtain an historical security posture score. For example, the historical security posture score may be a numerical value and may be based on the degree of anomalousness of historical data received from the data source. The degree of anomalous may be determined using one or more statistical characterizations of the historical data and/or a reputation of the data source (e.g., how often the historical data has included poisoned data).

A fitness analysis function may use one or more optimization criteria (e.g., relating to data characteristics and/or data source characteristics) to evaluate the test proposals (e.g., to determine a likelihood that each of the potentially poisoned portions are the poisoned data). For example, the fitness analysis function may include an objective function, and the optimization criteria may be used as variables of the objective function and/or to weight to the objective function.

Different fitness analysis functions may be generated using different selections of optimization criteria. Any number of fitness analysis functions may be generated by (a data processing system managing) fitness analysis function repository 208, and/or by a remote data processing system (e.g., operated by a third party). The fitness analysis functions may be organized in a database (e.g., that may be queried based on optimization criteria and/or other fitness analysis function identifiers), and/or may be stored in a repository, such as fitness analysis function repository 208. One or more fitness analysis functions may be used as part of an optimization process.

To obtain a fitness analysis function, optimization process 206 may provide a request to fitness analysis function repository 208. The request may include information such as data source IDs, and/or a list of optimization criteria (e.g., usable to query the fitness analysis function database). The fitness analysis function(s) may be queried and/or selected based on the goals of the optimization process (e.g., the minimization or maximization of one or more optimization criteria). The fitness analysis function, when minimized (or maximized, depending on the selected optimization criteria), may be used to find an optimal solution for the identification of poisoned data.

Returning to the evaluation of test proposals, the fitness analysis function may be used to obtain a fitness value for each test proposal (not shown). The fitness value may be based on a residual of a loss function (e.g., an objective function). The fitness value may be used to determine which test proposals best satisfy the loss function. For example, test proposals that are assigned smaller fitness values may better satisfy the loss function than those being assigned larger fitness values).

The fitness analysis function, defined by its variables (e.g., optimization criteria), may be impacted due to weighting. For example, one or more variables of the fitness analysis function may be weighted (e.g., using scalars and/or other variables), the residual of the fitness analysis function may be weighted by one or more variables, etc.

For example, the residual of the fitness analysis function may be weighted based on the number of data sources contributing to the potentially poisoned portion under the assumption that a malicious party is more likely to only have access to one data source than to multiple data sources at a given time, thus a potentially poisoned portion of data provided by multiple data sources may be more trustworthy (e.g., less likely to be poisoned) than a potentially poisoned portion of data provided by a single data source. Another consideration for the weighting of the residual may be that data sources with higher security posture scores may be more trustworthy (e.g., less likely to be accessed by a malicious party and/or less likely to provide poisoned data) than data sources with lower security posture scores. Thus, the fitness analysis function may be weighted to reflect impact(s) of data source characteristics (e.g., on the likelihood of the potentially poisoned portion being the poisoned portion) in order to obtain the fitness value (e.g., decreasing the fitness value may indicate the potentially poisoned portion is more likely to be poisoned).

The fitness value (e.g., which may indicate which potentially poisoned portions are most likely to be poisoned) may be used to rank each test proposal of a given iteration (e.g., in ascending order). One or more ranked test proposals may be selected for use in the subsequent iteration (e.g., to generate another set of test proposals). The selected test proposal(s) may be one or more of the highest-ranked test proposals (e.g., the test proposals that provide the most satisfactory solution to the global optimization problem for the given iteration).

The selected test proposals may undergo modifications before being used to generate the subsequent iteration of test proposals. For example, some elements of a selected test proposals may be adjusted (e.g., mutation), and/or other selected test proposals may be combined (e.g., crossover). However, in some cases, one or more selected test proposals may be used to generate the subsequent iteration without change (e.g., elitism).

Once a maximum number of iterations and/or a predetermined fitness value threshold is reached, optimization process 206 may identify a final test proposal. The final test proposal may indicate a delineation between the least anomalous potentially unpoisoned portion and the smallest potentially poisoned portion most likely to include all of the poisoned data. In other words, the final test proposal may determine the most likely poisoned portion of the data.

As discussed with respect to FIG. 1, the impact of supplying poisoned data to downstream consumers may adversely affect the intended computer-implemented services. Therefore, the poisoned portion of data may be flagged as poisoned data. The flagged data may include metadata such as (i) data pointer information, (ii) statistical characterizations that may indicate the degree of anomalousness of the data, (iii) a likelihood of the anomalous data being poisoned data (e.g., a fitness value), (iv) data source characteristics, including a likelihood that the data source is malicious, and/or (v) other metadata describing attributes of the flagged data.

To manage the impact of the identified poisoned data, action set generation 209 may generate an action set based on the flagged data from optimization process 206. For example, the action set may include (i) separating the poisoned portion of the data from the remainder of the data (e.g., the unpoisoned portion of the data), (ii) retaining (e.g., curating) the unpoisoned portion and/or making the unpoisoned portion available to downstream consumers, (iii) preventing storage of the poisoned portion of data in the data repository, (iv) screening the portion of poisoned data from use by a downstream consumer, (v) identifying and/or flagging a potentially malicious data source (e.g., that provided at least a portion of the poisoned data), (vi) terminating and/or pausing data collection from a potentially malicious data source, (vii) updating historical data source information based on the identified poisoned data, and/or (viii) performing other action to reduce impacts of the flagged data and/or data source.

Further analysis of the flagged data may include classifying data sources as having supplied poor quality, irrelevant, and/or poisoned data. The classified data sources may be labeled (e.g., as malicious data sources), assigned a level of risk (e.g., likelihood of being malicious), and/or may be managed accordingly.

Thus, as illustrated in FIG. 2, the system of FIG. 1 may perform data aggregation, anomaly detection, identify poisoned data obtained from data sources (e.g., based on anomaly detection performed on the aggregate data and the characteristics of the data source), and/or identify potentially malicious data sources. When poisoned data is identified an action set may be generated in order to (i) mitigate and/or prevent impacts to downstream consumers that may otherwise consume the poisoned data, and/or (ii) manage potentially malicious data sources to prevent future impacts of obtaining poisoned data from the potentially malicious data sources.

As discussed above, the components of FIG. 1 may perform methods for data curation from data sources that may supply poisoned data. The methods may include identifying poisoned data, and/or managing the introduction of the poisoned data (e.g., by identified malicious data sources) into the data pipeline by implementing remedial actions. FIG. 3 illustrates methods that may be performed by the components of FIG. 1. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of curating data from data sources using data source characteristics in accordance with an embodiment is shown. The method may be performed by a data processing system, and/or another device.

At operation 302, an identification that the data likely includes poisoned data may be made. The identification may be made by performing an anomaly detection process using a degree of anomalousness of the data and an anomaly threshold. The anomaly detection process may include (i)

obtaining aggregate data (e.g., to obtain an aggregate data summary) based on the data, (ii) obtaining a degree of anomalousness of the data (e.g., using information from the aggregate data summary), and/or (iii) evaluating the degree of anomalousness using the anomaly threshold. The evaluation of the degree of anomalousness may indicate whether the data includes poisoned data. For example, if a degree of anomalousness of a portion of data exceeds the anomaly threshold, the portion of data may include poisoned data.

Anomaly detection may be performed by an independent entity (e.g., a third party), thus, aggregate data summaries and/or statistical characterizations (e.g., degrees of anomalousness) may be provided to the independent entity for further analysis and/or anomaly detection. When anomalous data is detected, a notification (e.g., including information regarding the anomaly) may be obtained from the independent entity. For more information regarding data aggregation and anomaly detection, refer to the discussion of FIG. 2.

At operation 304, based on the identification made at operation 302, a fitness analysis function may be obtained. The fitness analysis function may be obtained by (i) reading the fitness analysis function from storage (e.g., from a fitness analysis function repository), (ii) receiving the fitness analysis function from another device, and/or (iii) generating the fitness analysis function.

For example, the fitness function repository may be managed by a data processing system (e.g., that may utilize a database). The fitness analysis function may be obtained from the repository by providing a request (e.g., including information to query the database, such as data source IDs and/or a list of optimization criteria to minimize and/or maximize) to the managing data processing system of the fitness analysis function repository. The fitness analysis function may be generated, for example, by providing a list of optimization criteria to an optimization process. The fitness analysis function may be used to evaluate potentially poisoned portions as part of the optimization process.

At operation 306, an optimization process may be performed to identify the poisoned data. The optimization process may be performed by ingesting the data into an optimization algorithm. The optimization process may be a global optimization process, and the optimization algorithm (e.g., global optimization algorithm) may be a genetic algorithm and/or may attempt to solve an optimization problem (e.g., identify the smallest portion of data that most likely includes the poisoned data) constrained by variables of a fitness analysis function. For example, the fitness analysis function may include a loss function and therefore, to identify the poisoned data, the optimization algorithm may attempt to find solutions to the optimization problem that minimize the residual of the objective function.

The optimization algorithm may generate iterations of candidate solutions (e.g., sets of test proposals) that indicate different delineations between potentially poisoned data and potentially unpoisoned data. Each subsequent iteration of candidate solutions may be generated based on the best candidates (e.g., test proposals) from the previous iteration.

Each test proposal of the set of test proposals (e.g., generated by each iteration) may be evaluated based on (i) a degree of anomalousness of each of the different portions of the data (e.g., defined by the delineations of each test proposal), (ii) a size of each of the different portions, (iii) security posture scores of each of the data sources supplying each of the different portions, and/or (iv) the number of data sources supplying each of the different portions.

The size of each portion may be determined by counting the number of elements within each portion. The degree of anomalousness of each portion may be based on a statistical characterization of each portion of the data (e.g., of an aggregate data summary of each portion of the data). The degree of anomalousness may be determined by comparing the statistical characterization to one or more anomaly thresholds (e.g., including the anomaly threshold used for anomaly detection in operation 302).

An historical security posture score for a data source may be determined by evaluating degrees of anomalousness and/or the frequency of poisoned data detections from portions of historical data obtained from the data source.

A current security posture score may be determined by evaluating the degree of anomalousness of a current data portion obtained from the data source with respect to the degree of anomalousness of the historical data. For example, an increase in the degree of anomalousness of current data from a given data source may indicate a higher likelihood that the current data is poisoned; whereas a data source that consistently supplies poor-quality data may maintain a consistent degree of data anomalousness.

The security posture score(s) (e.g., current security posture score and/or the historical security posture score) may also be determined based on a relative magnitude of a potential impact associated with the consumption (e.g., by downstream consumers) of the potentially poisoned data. For example, the potential impact of a downstream consumer consuming a first potentially poisoned portion of data may be higher (e.g., which may result in a shutdown of computer-implemented services) than consuming a second potentially poisoned portion (e.g., which may result in a slowdown of the computer-implemented services). Thus, the security posture score may be reduced for higher-impact potentially poisoned portions, reducing the level of trustworthiness of the data source.

The number of data sources supplying a portion of data may be determined by identifying each data source that contributed data to the portion (e.g., identifying a unique list of data source IDs from metadata), and enumerating each of the contributing data sources.

The test proposals may be evaluated using the fitness analysis function and/or may be assigned fitness values accordingly. For example, the fitness analysis function may penalize each test proposal (e.g., the fitness value of each test proposal) proportionally to a ratio of the size of the poisoned portion to the size of the unpoisoned portion. In other words, a test proposal indicating a smaller poisoned portion of data and a less anomalous unpoisoned portion may be assigned a more satisfactory fitness value when compared other test proposals having larger poisoned portions and more anomalous unpoisoned portions.

The fitness analysis function may also penalize the fitness value of each test proposal, for example, proportionally to the number of data sources providing the data. In other words, the potentially poisoned portion of data may be significantly less likely to be poisoned when more data sources contribute to the portion. The fitness analysis function may weight its constraint variables (e.g., anomalousness, size, and/or data source characteristics) differently depending on anomaly detection goals.

The fitness analysis function may penalize the fitness value of each test proposal based on the reliability (and/or reputation) of the data source. For example, a test proposal indicating a potentially poisoned portion from a consistently unreliable data source (e.g., that has historically provided anomalous but unpoisoned data) may be penalized. The penalty may reduce the likelihood that the potentially poisoned portion of data is poisoned.

Once evaluated, each test proposal may be ranked (e.g., ordered by rank) based on its assigned fitness value. For example, the most satisfactory fitness value (e.g., smallest) may be the highest-ranked test proposal. One or more highest-ranked test proposals may be selected to generate the subsequent iteration of test proposals; however, if the global optimization process has terminated (e.g., a maximum number of iterations and/or a predetermined fitness value threshold has been reached), a final test proposal may be selected as the optimized solution of the global optimization process.

For example, the final test proposal may be the highest-ranked test proposal of the last iteration of the optimization algorithm. The final test proposal of the global optimization process may indicate a delineation between an identified (most likely) poisoned portion of the data and the remainder of the data (e.g., the unpoisoned portion).

Once identified, the poisoned portion of data may be flagged in order to manage the impact of the poisoned portion of data. The flagged data may be used to generate an action set that may be implemented to mitigate the effects of the poisoned data on consumers of the data (e.g., downstream consumers). Refer to the discussion of FIG. 2 for more details regarding the identification and/or remediation of poisoned data.

At operation 308, performance of an action set may be initiated. Performance of the action set may be initiated by obtaining the action set. The action set may be obtained by (i) reading the action set from storage, (ii) receiving the action set from another device, and/or (iii) generating the action set (e.g., based on the identified poisoned data from operation 304). Performance of the action set may be initiated by transmitting at least a portion of the action set and/or instructions regarding implementing the action set to another entity. One or more actions from the action set may be performed, and performance of the action(s) may be based on information regarding the poisoned data (e.g., flagged data).

Information regarding the flagged data may include (i) a likelihood that the flagged data is poisoned (e.g., malicious), (ii) a severity of a level of risk associated with the flagged data, (iii) information regarding a data source from which the poisoned data was obtained (e.g., a data source ID), and/or (iv) other information usable to manage the poisoned data, a malicious data source, and/or their impacts. The action(s), when performed, may reduce and/or prevent an impact (e.g., a negative impact to computer-implemented services) of the identified poisoned data.

The method may end following operation 306.

Using the method illustrated in FIG. 3, a system in accordance with embodiments disclosed herein may be placed in condition to (i) identify poisoned data collected from data sources during data curation (e.g., by performing anomaly detection on aggregate data), (ii) identify the data sources that provided the poisoned data, (iii) prevent and/or mitigate the impact of the poisoned portions of the curated data by generating and/or implementing remedial action sets, and/or (iv) reduce the likelihood of poisoned data being provided to downstream consumers (e.g., through proactive identification), thereby avoiding interruptions and/or reductions in the quality of the computer-implemented services that may rely on the curated data.

Figure 4:
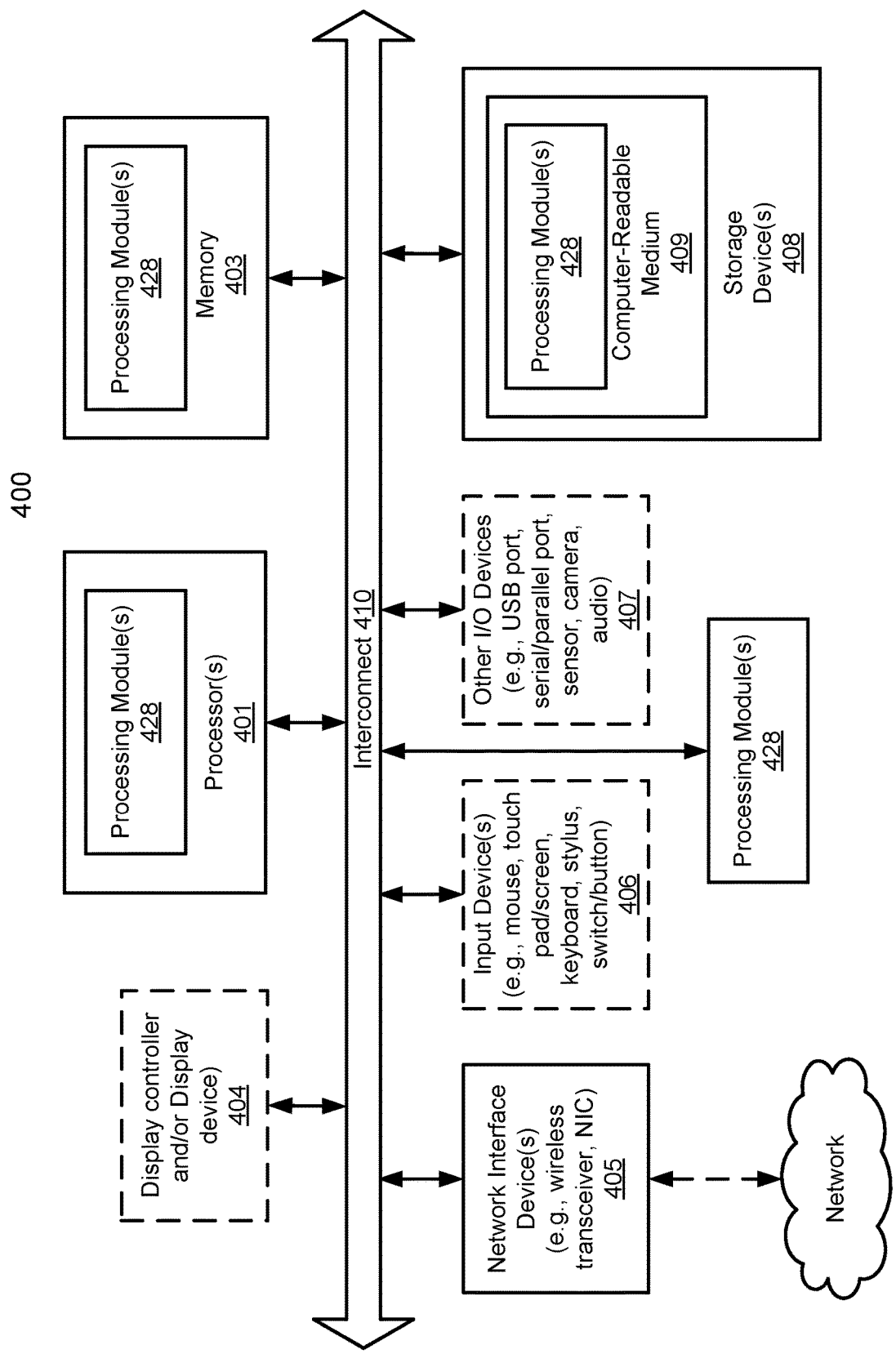
FIG. 4 shows a block diagram illustrating a data processing system in accordance with an embodiment.

Any of the components illustrated and/or described with respect to FIGS. 1-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as Vx Works.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such, details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for curating data from data sources prior to addition to a data repository, comprising:
    making an identification that the data comprises poisoned data; and
    based on the identification:
        obtaining a fitness analysis function based on criteria for evaluating potentially poisoned data, the criteria comprising:
            an historical security posture for each data source of the data sources;
            a current security posture of each data source; and
            a number of data sources providing the data,
        performing an optimization process using the data to identify the poisoned data, the optimization process comprises generating test proposals that indicate different delineations between the potentially poisoned data and potentially unpoisoned data, and evaluating the test proposals using the fitness analysis function, and
        initiating performance of an action set, based on the identified poisoned data, to manage an impact of the identified poisoned data.

2. The method of claim 1, wherein making the identification comprises performing an anomaly detection process using at least:
    an anomaly threshold; and
    a first degree of anomalousness of the data, the data being aggregate data and the first degree of anomalousness being based on a first aggregate data summary for the aggregate data.

3. The method of claim 2, wherein the criteria further comprise degrees of anomalousness of portions of the data and sizes of the portions.

4. The method of claim 3, wherein the current security posture of each data source is based on a degree of anomalousness of the data with respect to historical data, the historical data being provided by the data source prior to the data source supplying the data.

5. The method of claim 4, wherein the fitness analysis function penalizes each test proposal proportionally to a ratio of a size of a potentially poisoned portion of the data to a size of a potentially unpoisoned portion of the data.

6. The method of claim 5, wherein the fitness analysis function penalizes each test proposal proportionally to the number of data sources providing the data.

7. The method of claim 6, wherein performing the optimization process comprises:
    iteratively generating sets of the test proposals, each subsequent set of the sets being generated based on a selection of the test proposals from a previous set, the selection being based on a rank ordering of the test proposals of the previous set.

8. The method of claim 7, wherein the rank ordering is obtained by:
    evaluating each test proposal of the test proposals using the fitness analysis function to obtain a fitness value for each test proposal; and
    obtaining the rank for each test proposal based on the fitness value, the rank being usable to order the test proposals.

9. The method of claim 8, wherein identifying the poisoned data comprises selecting a final test proposal of the test proposals based on the ranks of the test proposals, the final test proposal being an optimized solution of the optimization process.

10. The method of claim 9, wherein the action set comprises screening the poisoned data from use by a downstream consumer.

11. The method of claim 10, wherein the action set comprises identifying a potentially malicious data source that provided at least a portion of the identified poisoned data.

12. A non-transitory machine-readable medium having instructions stored therein, which when executed by a processor, cause the processor to perform operations for curating data from data sources prior to addition to a data repository, the operations comprising:
    making an identification that the data comprises poisoned data; and
    based on the identification:
        obtaining a fitness analysis function based on criteria for evaluating potentially poisoned data, the criteria comprising:
            an historical security posture for each data source of the data sources;
            a current security posture of each data source; and a number of data sources providing the data, performing an optimization process using the data to identify the poisoned data, the optimization process comprises generating test proposals that indicate different delineations between the potentially poisoned data and potentially unpoisoned data, and evaluating the test proposals using the fitness analysis function, and initiating performance of an action set, based on the identified poisoned data, to manage an impact of the identified poisoned data.

13. The non-transitory machine-readable medium of claim 12, wherein making the identification comprises performing an anomaly detection process using at least:

an anomaly threshold; and a first degree of anomalousness of the data, the data being aggregate data and the first degree of anomalousness being based on a first aggregate data summary for the aggregate data.

14. The non-transitory machine-readable medium of claim 13, wherein the criteria further comprise degrees of anomalousness of portions of the data and sizes of the portions.

15. The non-transitory machine-readable medium of claim 14, wherein the current security posture of each data source is based on a degree of anomalousness of the data with respect to historical data, the historical data being provided by the data source prior to the data source supplying the data.

16. The non-transitory machine-readable medium of claim 15, wherein the fitness analysis function penalizes each test proposal proportionally to a ratio of a size of a potentially poisoned portion of the data to a size of a potentially unpoisoned portion of the data.

17. A data processing system, comprising:

a processor; and a memory coupled to the processor to store instructions, which when executed by the processor, cause the processor to perform operations for curating data from data sources prior to addition to a data repository, the operations comprising:

making an identification that the data comprises poisoned data, and based on the identification:

obtaining a fitness analysis function based on criteria for evaluating potentially poisoned data, the criteria comprising:

an historical security posture for each data source of the data sources, a current security posture of each data source, and a number of data sources providing the data;

performing an optimization process using the data to identify the poisoned data, the optimization process comprises generating test proposals that indicate different delineations between the potentially poisoned data and potentially unpoisoned data, and evaluating the test proposals using the fitness analysis function; and initiating performance of an action set, based on the identified poisoned data, to manage an impact of the identified poisoned data.

18. The data processing system of claim 17, wherein making the identification comprises performing an anomaly detection process using at least:

an anomaly threshold; and a first degree of anomalousness of the data, the data being aggregate data and the first degree of anomalousness being based on a first aggregate data summary for the aggregate data.

19. The data processing system of claim 18, wherein the criteria further comprise degrees of anomalousness of portions of the data and sizes of the portions.

20. The data processing system of claim 19, wherein the current security posture of each data source is based on a degree of anomalousness of the data with respect to historical data, the historical data being provided by the data source prior to the data source supplying the data.

* * * * *